US012267930B2

(12) United States Patent
Weng et al.

(10) Patent No.: US 12,267,930 B2
(45) Date of Patent: Apr. 1, 2025

(54) INTELLIGENT MUSIC LAMP STRING

(71) Applicant: Fan Zhang, Taizhou (CN)

(72) Inventors: Yunbing Weng, Taizhou (CN); Fan Zhang, Taizhou (CN)

(73) Assignee: Fan Zhang, Taizhou (CN)

( * ) Notice: Subject to any disclaimer, the term of this patent is extended or adjusted under 35 U.S.C. 154(b) by 0 days.

(21) Appl. No.: 18/788,335

(22) Filed: Jul. 30, 2024

(65) Prior Publication Data

US 2025/0040017 A1 Jan. 30, 2025

Related U.S. Application Data

(63) Continuation-in-part of application No. 17/586,669, filed on Jan. 27, 2022, now Pat. No. 12,082,316.

(51) Int. Cl.

| | |
|---|---|
| ***H05B 47/115*** | (2020.01) |
| ***F21S 4/28*** | (2016.01) |
| ***F21V 23/00*** | (2015.01) |
| ***F21V 23/04*** | (2006.01) |
| ***F21V 33/00*** | (2006.01) |
| ***F21Y 107/00*** | (2016.01) |
| ***F21Y 115/10*** | (2016.01) |
| ***H04R 1/02*** | (2006.01) |
| ***H05B 45/50*** | (2022.01) |
| ***H05B 47/19*** | (2020.01) |

(52) U.S. Cl.

CPC .............. *H05B 47/115* (2020.01); *F21S 4/28* (2016.01); *F21V 23/008* (2013.01); *F21V 23/0471* (2013.01); *F21V 33/0028* (2013.01); *H04R 1/028* (2013.01); *H05B 45/50* (2020.01); *H05B 47/19* (2020.01); *F21Y 2107/00* (2016.08); *F21Y 2115/10* (2016.08); *H04R 2420/07* (2013.01); *H04R 2430/01* (2013.01)

(58) Field of Classification Search

CPC ... H05B 45/10; H05B 47/105; F21V 33/0056; G06F 3/16; F21Y 2115/10

See application file for complete search history.

(56) References Cited

U.S. PATENT DOCUMENTS

2015/0084515 A1* 3/2015 Altamura ............. H05B 47/175 315/131

* cited by examiner

*Primary Examiner* — Evan P Dzierzynski
*Assistant Examiner* — Jessica M Apenteng

(57) ABSTRACT

The present disclosure provides an intelligent music lamp string. The intelligent music lamp string includes a human body sensing module, a control module, a music control module and a lamp string. The human body sensing module is configured to sense a human body and output a sensing signal when the human body is sensed. The control module is configured to receive the sensing signal and output an enable signal and a control signal according to the sensing signal. The music control module is configured to receive the enable signal and play a predetermined music according to the enable signal. The lamp string is configured to receive the control signal and start to work according to the control signal, a duty cycle of the control signal in each cycle corresponding to beats of each section of the predetermined music.

20 Claims, 5 Drawing Sheets

INTELLIGENT MUSIC LAMP STRING

CROSS-REFERENCE TO RELATED APPLICATIONS

This application claims priority of Chinese Patent Application No. 2022200123425, entitled "AN INTELLIGENT MUSIC LAMP STRING" filed on Jan. 5, 2022. This application is a continuation-in-part of U.S. patent application Ser. No. 17/586,669 filed Jan. 27, 2022. Both of the above applications are incorporated by reference herein.

FIELD

The present disclosure relates to lamp string technology field, and specifically to an intelligent music lamp string, an intelligent music lighting device, and a method for providing an intelligent music lamp string.

BACKGROUND

With the improvement of living standards, people have higher and higher requirements for the living environment. In festivals, parties and other scenes, decorations such as lamp strings, wool tops, sequins and balloons are usually used to decorate the environment and set off the atmosphere. Among them, a music lamp string has become the first choice to add festival atmosphere in the festival because of its music effect.

However, the existing music lamp string usually only receives music signals through a microphone to realize a musical rhythm of the lamp string, using range of the existing music lamp string is limited.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an intelligent music lamp string is provided, comprising:

- a human body sensor capable of generating a sensing signal;
- a controller, configured to receive the sensing signal and output a control signal according to the sensing signal, comprises a music chip and a horn, an enable end of the music chip is electrically connected to the human body sensor, an output end of the music chip is electrically connected to the horn, the predetermined music is stored in the music chip, and when the controller receives the sensing signal, the music chip controls the horn to play the predetermined music; and
- a lamp string electrically connected to the controller, the lamp string configured to receive the control signal, and when the lamp string receives the control signal, the lamp string working in a predetermined way corresponding to the predetermined music.

In another aspect, an intelligent music lighting device is provided, comprising:

- a human body sensor capable of generating a sensing signal;
- a controller, electrically connected to the human body sensor;

- a lamp string electrically connected to the controller; and
- wherein the controller comprises a music chip and a horn, an enable end of the music chip is electrically connected to the human body sensor, an output end of the music chip is electrically connected to the horn, the predetermined music is stored in the music chip, and when the controller receives the sensing signal, the controller controls the music chip to enable the horn to play the predetermined music, and the lamp string working in a predetermined way corresponding to the predetermined music.

In another aspect, a method for providing an intelligent music lamp string is provided, the method comprising:

- providing a human body sensor capable of generating a sensing signal;
- providing a control module, electrically connected to the human body sensing module and configured to receive the sensing signal and output an enable signal and a control signal according to the sensing signal;
- providing a music chip and a horn, an enable end of the music chip is electrically connected to the control module and configured to receive the enable signal and to control the horn to play predetermined music according to the enable signal, an output end of the music chip is electrically connected to the horn, the predetermined music is stored in the music chip;
- providing a lamp string, electrically connected with the control module and configured to receive the control signal; and
- wherein when the control module receives the sensing signal from the human body sensor, outputting the enable signal and the control signal according to the sensing signal,
- when the music chip receives the enable signal from the control module, controlling the horn to play the predetermined music according to the enable signal,
- and when the lamp string receives the control signal,
- working in a predetermined way corresponding to the predetermined music.

The above aspects or examples and advantages, as well as other aspects or examples and advantages, will become apparent from the ensuing description and accompanying drawings.

BRIEF DESCRIPTION OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary skill in the art, they may obtain other drawings according to these attached drawings without any innovative laboring.

The present disclosure will be further described with reference to the attached drawings and the embodiments hereunder.

DETAILED DESCRIPTION

In order to provide a clear understanding of the objects, features, and advantages of the embodiments, the following are detailed and complete descriptions to the technological solutions adopted in the embodiments. Obviously, the descriptions are part of the whole embodiments. The other embodiments which are not processed creatively by technicians of ordinary skills in the field are under the protection of this disclosure. The same is given with reference to the drawings and specific embodiments. It should be noted that non-conflicting embodiments in the disclosure and the features in the embodiments may be combined with each other without conflict.

In the following description, numerous specific details are set forth in order to provide a full understanding of the disclosure. The disclosure may be practiced otherwise than as described herein. The following specific embodiments are not to limit the scope of the disclosure.

Unless defined otherwise, all technical and scientific terms herein have the same meaning as used in the field of the art as generally understood. The terms used in the disclosure are to describe particular embodiments and are not intended to limit the disclosure.

The disclosure, referencing the accompanying drawings, is illustrated by way of examples and not by way of limitation. It should be noted that references to "an" or "one" embodiment in this disclosure are not necessarily to the same embodiment, and such references mean "at least one."

Figure 1:
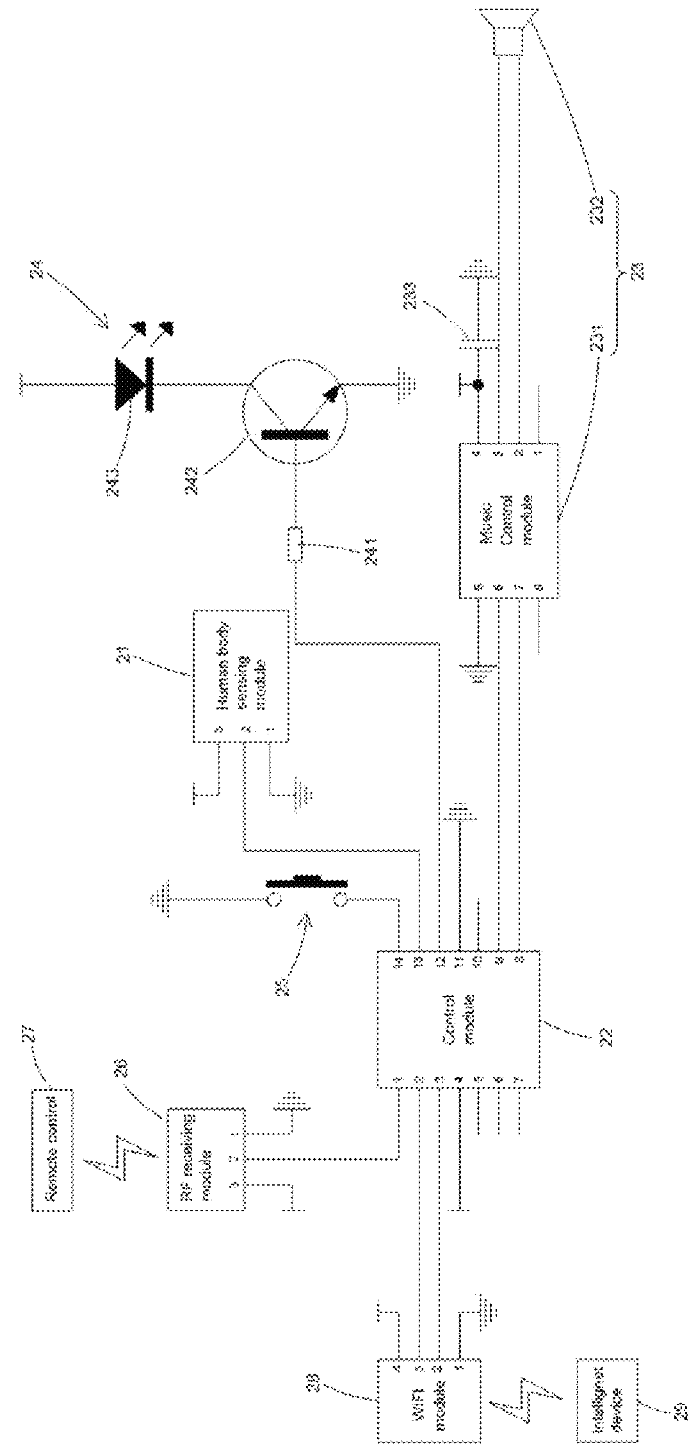
FIG. 1 is a circuit diagram of an intelligent music lamp string according to an embodiment of the present disclosure.

Referring to FIG. 1, an intelligent music lamp string 20 includes a human body sensing module 21, a control module 22 connected with the human body sensing module 22, a music control module 23 connected with the control module 22 and a lamp string 24 connected with the control module 22. The human body sensing module 21 is configured to sense a human body and output a sensing signal when the human body is sensed. The control module 22 is configured to receive the sensing signal and output an enable signal and a control signal according to the sensing signal, and the enable signal and the control signal is outputted by different output terminals of the control module 22. The music control module 23 is configured to receive the enable signal and control the playing of a predetermined music according to the enable signal. The lamp string 24 is configured to receive the control signal and to work in a predetermined way corresponding to the predetermined music according to the control signal, an example of the predetermined way corresponding to the predetermined music comprises a working mode that a duty cycle of the control signal in each cycle corresponds to a beat of each section of the predetermined music.

It is understandable that, in some embodiments, human body sensing module 21 is a sensor such as infrared (IR) motion sensor, passive Infrared (PIR) sensor, ultrasonic sensor, capacitive sensor, camera-based system, etc.

It is understandable that, in some embodiments, either the control module 22 or the music control module 23 is a part of controller which is a device or a module of controller which is a circuit system.

It is understandable that, in some embodiments, intelligent music lamp string 20 is able to be replaced by other lighting devices such as electrical candle, projector, etc.

Further, a chip model of the control module 22 is FMD FT61XX, and a chip model of the human body sensing module 21 is RCWL-0517. The control module 22 includes fourteen pins numbered 1~14, the number 4 pin of the control module 22 is connected with a power source to receive a power signal V+, and the number 11 pin of the control module 22 is grounded. The human body sensing module 21 senses movement of the human body by a radar in real time so as to sense the human body. The human body sensing module 21 includes three pins numbered 1~3, the number 3 pin of the human body sensing module 21 is connected with the power source to receive the power signal V+, the number 1 pin of the human body sensing module 21 is grounded, and the number 2 pin of the human body sensing module 21 is connected with the number 13 pin of the control module 22. When the human body is sensed by the human body sensing module 21, the number 2 pin of the human body sensing module 21 outputs the sensing signal and provides the sensing signal to the number 13 pin of the control module 22 so as to provide the sensing signal to the control module 22. When the control module 22 receives the sensing signal, the control module 22 outputs the enable signal through the number 9 pin and outputs the control signal through the number 12 pin.

The intelligent music lamp string 20 further includes a button 25, an end of the button is connected with the control module 22, and the other end of the button 25 is grounded. The button 25 is configured to control the control module 22 output different adjusting signals through the number 8 pin.

The music control module 23 includes a music chip 231 and a horn 232, an enable end of the music chip 231 is connected with the control module, 22 and an output end of the music chip 231 is connected with the horn 232. A chip model of the music chip 231 is EV3P087J, and the music chip 231 includes eight pins numbered 1~8. The number 4 pin of the music chip 231 is connected with the power source to receive the power signal V+ and is grounded via a capacitance 233, the number 5 pin of the music chip 231 is grounded, the number 2 pin and the number 3 pin of the music chip 231 are connected with a positive electrode and a negative electrode of the horn 232 respectively, the number 6 pin and the number 7 pin of the music chip 231 is connected with the number 9 pin and the number 8 pine of the control module 22. The predetermined music is stored in the music chip 231, and when the music chip 231 receives the enable signal, the music chip 231 controls the horn 232 to play the predetermined music. When the music chip 231 receives an adjusting signal from the number 8 pin of the control module 22, the music chip 231 adjusts a volume of the horn 232 according to the adjusting signal.

It is understandable that, in some embodiments, either the music chip 231 or the horn 232 is an independent part of controller which is a device or an independent module of controller which is a circuit system.

Further, the lamp string 24 includes a protection resistance 241, an NPN type transistor 242 and an LED string 243, an end of the protection resistance 241 is connected with the control module 22, the other end of the protection resistance 241 is connected with a base of the NPN type transistor 242, a collector of the NPN type transistor 242 is connected with a negative electrode of the LED string, 243 an emitter of the NPN type transistor 242 is grounded, a positive electrode of the LED string 243 is configured to receive the power signal V+ from the power source. When the base of the NPN type transistor 242 receives the control signal from the number 12 pin of the control module 22, the NPN type transistor 242 is turned on or turned off according to the control signal, so as to control the LED string 243 shine. Because the duty cycle of the control signal in each cycle corresponds to a beat of each section of the predetermined music, the LED string 243 shines according to the beats of the predetermined music. That is, the lamp string 24 shines according to the beats of the predetermined music without an external drive (such as a microphone) and has the advantages of low cost.

It can be understood, the predetermined music has definite beats, and the control signal can be generated through artificial way according to the definite beats of the predetermined music. For example, the beats of each section of the predetermined music includes a strong beat and a weak beat, when the strong beat is provided, a voltage level of the control signal is high, and when the weak beat is provided, the voltage level of the control signal is low. The strong beat and the weak beat are provided periodically. Therefore, the control signal can control the LED string 243 shine with a musical rhythm of the predetermined music. It can be understood, the duty cycle of the control signal is defined by the high voltage level in a period.

The intelligent music string 20 further includes a radio frequency (RF) receiving module 26 configured to connected with the control module 22 and a remote control 27 and a WIFI module 28 configured to connected with the control module 22 and an intelligent device 29. Through above structure, the intelligent music string 20 can be controlled by the remote control 27 and the intelligent device 29.

The intelligent device 29 can be, for example, a mobile phone, a tablet computer, etc. Of course, the WIFI module 28 can also be replaced by a bluetooth module or a 4G/5G module.

Specifically, the WIFI module 28 may includes four pins numbered 1~4, the number 4 pin of the WIFI module 28 is connected to the power source to receive the power voltage V+, the number 1 pin of the WIFI module 28 is grounded, and the number 3 pin and the number 2 pin of the WIFI module 28 are connected to the number 2 pin and the number 2 pin of the control module 22 respectively. The RF receiving module 26 includes three pins numbered 1~3, the number 3 pin of the RF receiving module 26 is connected to the power source to receive the power voltage V+, the number 1 pin of the RF receive module 26 is grounded, and the number 2 pin of the RF receive module 26 is connected to the number 1 pin of the control module 22.

The present disclosure also has the beneficial effects: through the above structure, the human body sensing module 21 senses the human body in real time and outputs the sensing signal when the human body is sensed; the control module 22 receives the sensing signal and outputs an enable signal and a control signal according to the sensing signal, the enable signal and the control signal are outputted by different output terminals; the music control module 23 receives the enable signal and play a predetermined music according to the enable signal; the lamp string 24 receives the control signal and start to work according to the control signal, a duty cycle of the control signal in each cycle corresponds to beats of each section of the predetermined music, then, the lamp string 24 shines according to the beats of the predetermined music without an external drive (such as a microphone) and has the advantages of low cost.

Figure 2:
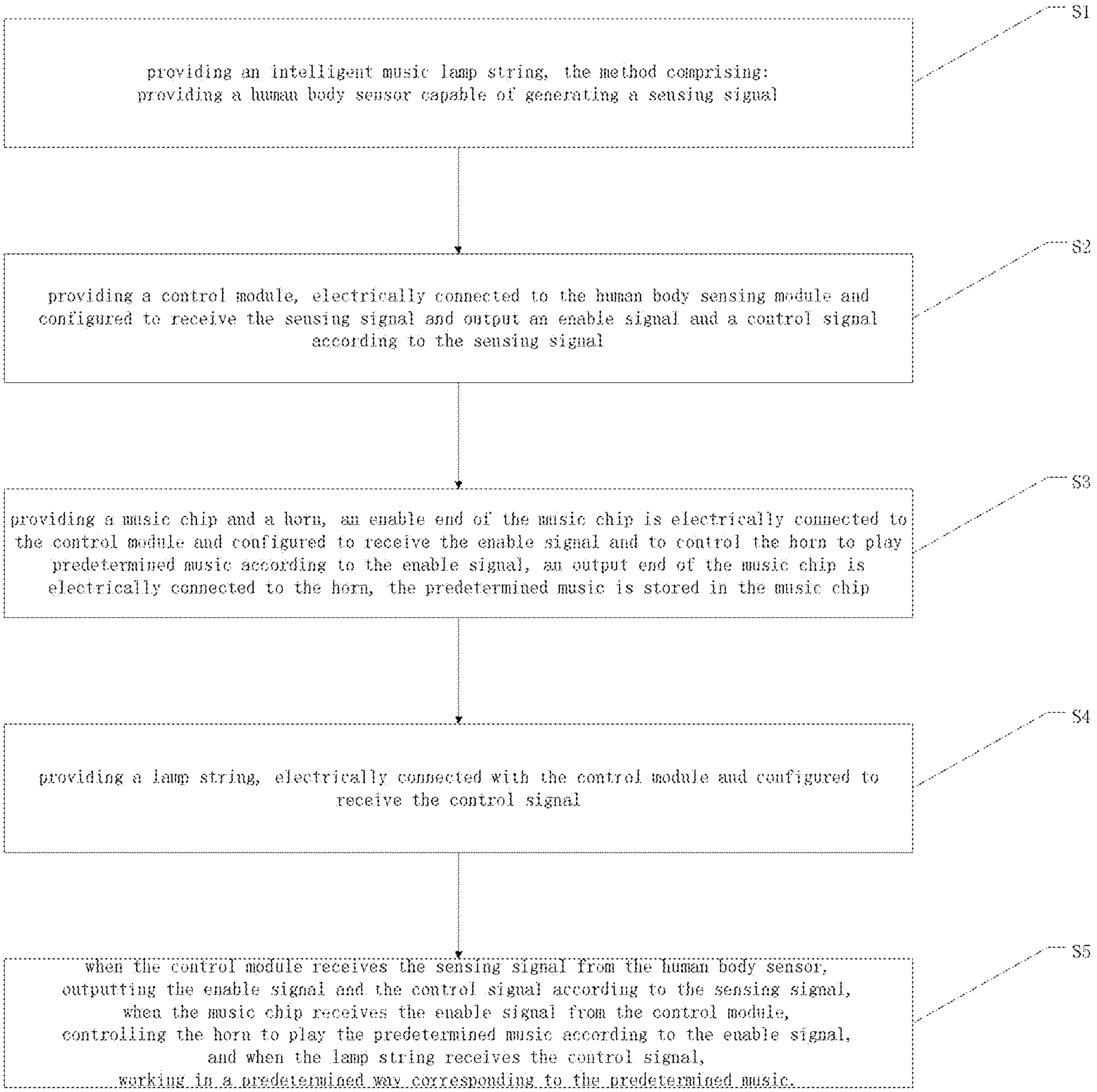
FIG. 2 is a flow chart of a method for providing an intelligent music lamp string according to an embodiment of the present disclosure.

FIG. 2 illustrates an method for providing an intelligent music lamp string, the method comprising the following steps:

S1. Providing a human body sensor capable of generating a sensing signal.

S2. Providing a control module, electrically connected to the human body sensing module and configured to receive the sensing signal and output an enable signal and a control signal according to the sensing signal.

S3. Providing a music chip and a horn, an enable end of the music chip is electrically connected to the control module and configured to receive the enable signal and to control the horn to play predetermined music according to the enable signal, an output end of the music chip is electrically connected to the horn, the predetermined music is stored in the music chip.

S4. Providing a lamp string, electrically connected with the control module and configured to receive the control signal.

S5. When the control module receives the sensing signal from the human body sensor, outputting the enable signal and the control signal according to the sensing signal.

S6. When the music chip receives the enable signal from the control module, controlling the horn to play the predetermined music according to the enable signal.

S7. When the lamp string receives the control signal, working in a predetermined way corresponding to the predetermined music.

Specifically, Providing an intelligent music lamp string of claim 19, wherein the predetermined way corresponding to the predetermined music comprises a working mode that a duty cycle of the control signal in each cycle corresponds to beats of each section of the predetermined music.

Figure 3:
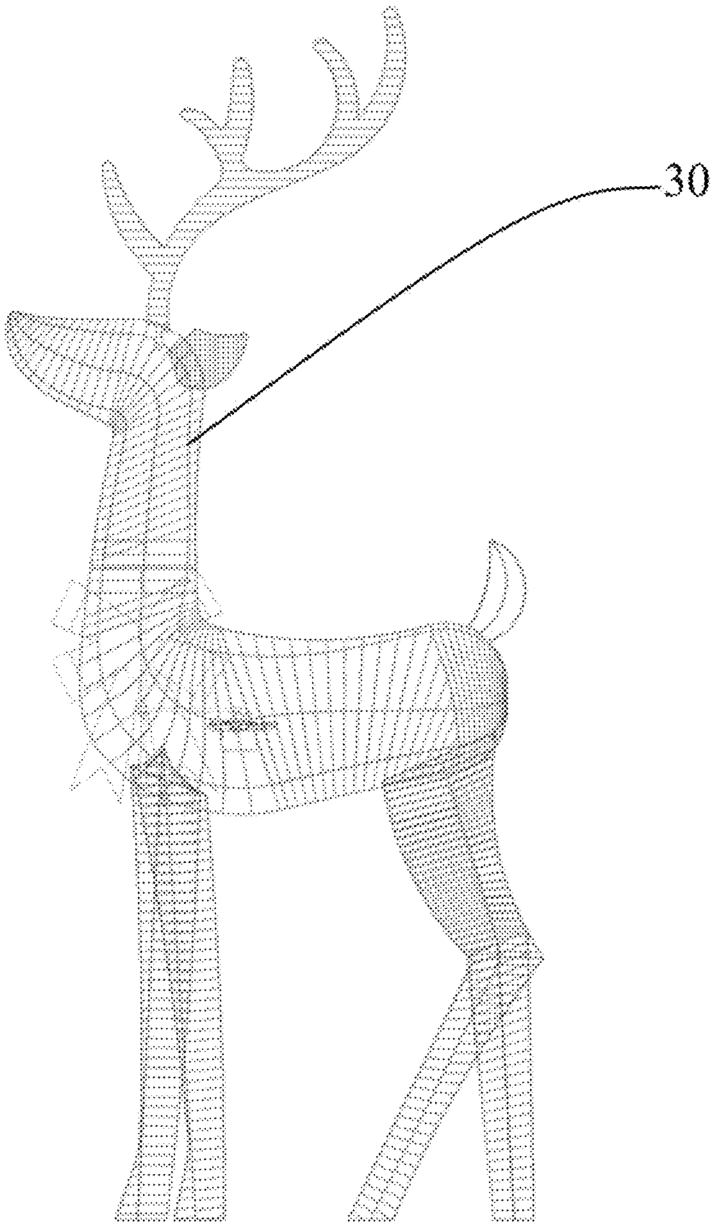
FIG. 3 is a schematic view of a holiday decoration in the 3D shape of an elk applying the intelligent music lamp string according to an embodiment of the present disclosure.

FIG. 3 illustrates an a holiday decoration in the 3D shape of an elk applying the intelligent music lamp string, the holiday decoration comprises a frame 30, the intelligent music lamp string 20 is wrapped around the frame 30, to match the shape of the decoration, the predetermined music could be the sound of a moose howling, Christmas songs, etc.

Figure 4:
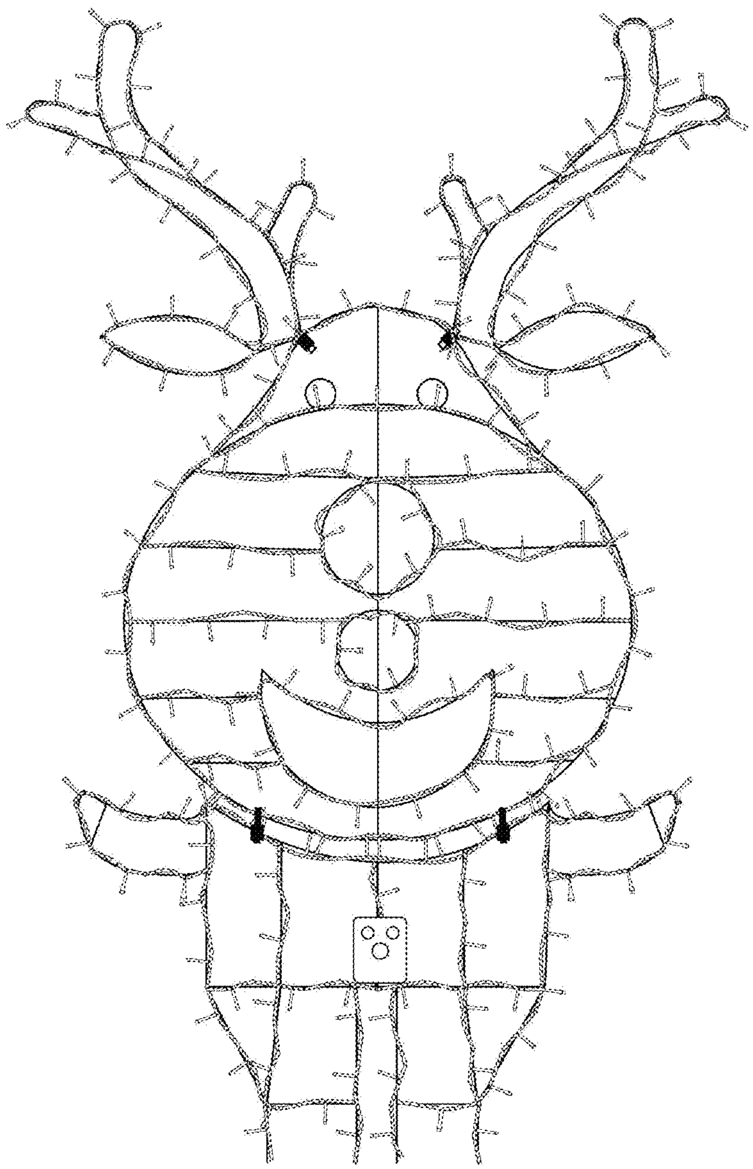
FIG. 4 is a schematic view of a holiday decoration in the 2D shape of a cartoon elk applying the intelligent music lamp string according to an embodiment of the present disclosure.

FIG. 4 illustrates an a holiday decoration in the 2D shape of a cartoon elk applying the intelligent music lamp string, the holiday decoration comprises at least a frame 40, the intelligent music lamp string 20 is wrapped around the frame 30, to match the shape of the decoration, the predetermined music could be the sound of a moose howling, Christmas songs, etc.

Figure 5:
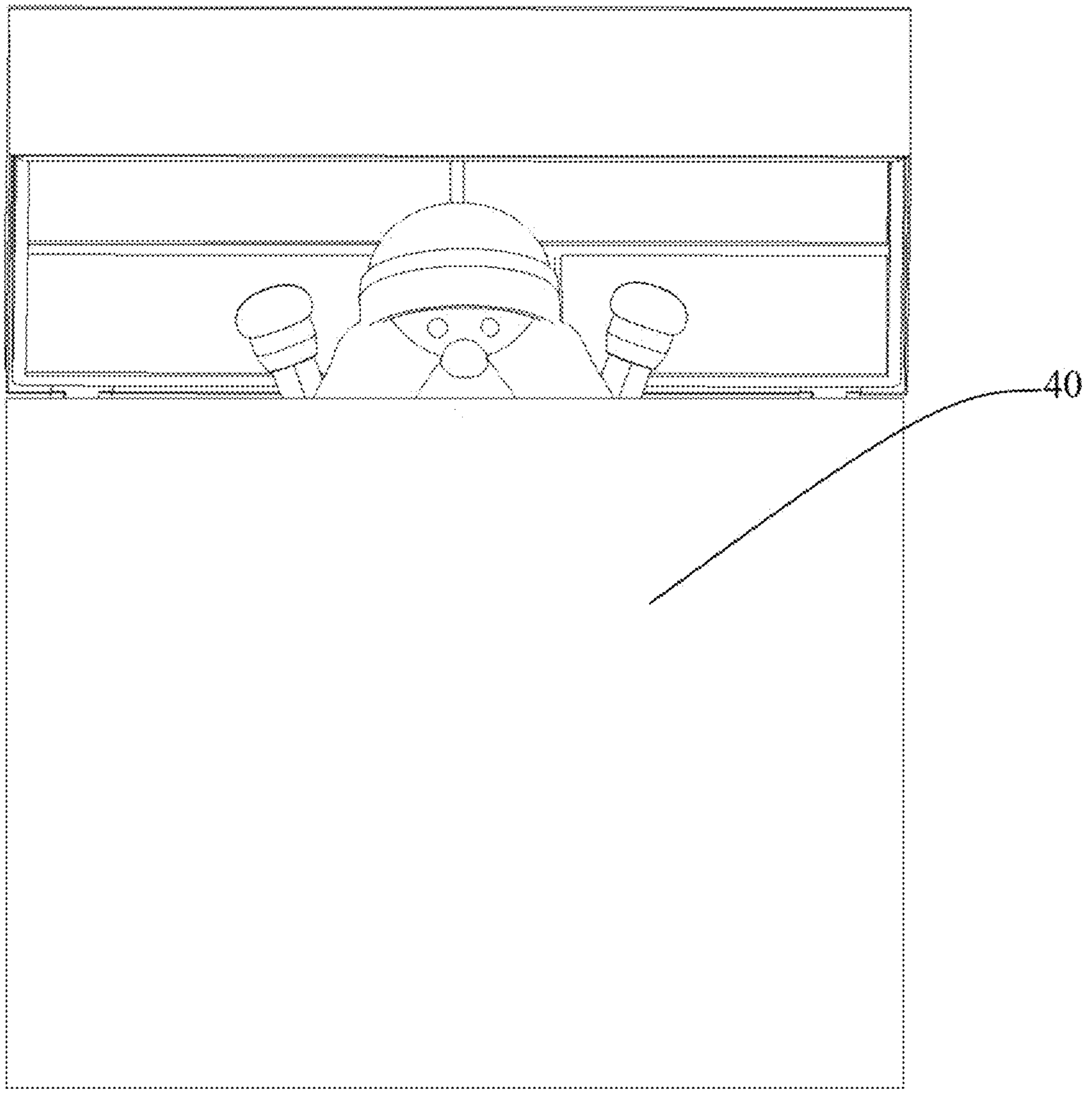
FIG. 5 is a schematic view of a holiday decoration in the 3D shape of a Christmas gift box applying the intelligent music lamp string according to an embodiment of the present disclosure.

FIG. 5 illustrates an a holiday decoration in the 3D shape of a Christmas gift box applying the intelligent music lamp string, the holiday decoration comprises a frame 30, the intelligent music lamp string 20 is adhered to the surface, and it is understandable that, in some embodiments, the attachment of intelligent music lamp string 20 to the surface 40 is also possible by means of wrapping fixation by piercing the surface with a tie, adsorption by magnets, etc., but not limited thereto.to match the shape of the decoration, the predetermined music could be the Santa's Sayings, Christmas songs, etc.

It is understandable that, in some embodiments, the holiday decoration could be in the in the 2D or 3D shape of other holiday things, the predetermined music match the shape of the decoration.

Finally, it should be noted that above embodiments are merely used for illustrating the technical solutions of the disclosure, rather than limiting the disclosure; though the disclosure is illustrated in detail with reference to the aforementioned embodiments, it should be understood by those of ordinary skill in the art that modifications may still be made on the technical solutions disclosed in the aforementioned respective embodiments, or equivalent substitutions may be made to a part of technical features thereof; and these modifications or substitutions do not make the essence of the corresponding technical solutions depart from the spirit and scope of the technical solutions of the respective embodiments of the disclosure.

What is claimed is:

1. An intelligent music lamp string, comprising:

a human body sensor capable of generating a sensing signal;

a controller, configured to receive the sensing signal and output a control signal according to the sensing signal, comprises a music chip and a horn, an enable end of the music chip is electrically connected to the human body sensor, an output end of the music chip is electrically connected to the horn, the predetermined music is stored in the music chip, and when the controller receives the sensing signal, the music chip controls the horn to play the predetermined music; and a lamp string electrically connected to the controller, the lamp string configured to receive the control signal, and when the lamp string receives the control signal, the lamp string working in a predetermined way corresponding to the predetermined music.

2. The intelligent music lamp string of claim 1, wherein the controller further comprises a control module, the control module is configured to receive the sensing signal and output an enable signal and a control signal according to the sensing signal, the enable signal and the control signal being outputted by different output terminals.

3. The intelligent music lamp string of claim 2, wherein a chip model of the control module is FMD FT61XX, a chip model of the human body sensing module is RCWL-0517, and a chip model of the music chip is EV3P087J.

4. The intelligent music lamp string of claim 2, wherein the controller further comprises a radio frequency receiving module, configuring to connected with at least one of following parts: the control module, a remote control, a WIFI module configured to connected with the control module, and an intelligent device.

5. The intelligent music lamp string of claim 2, wherein the lamp string is configured to receive the control signal, and when the lamp string receives the control signal, the lamp string working in a predetermined way corresponding to the predetermined music.

6. The intelligent music lamp string of claim 2, wherein the intelligent music lamp string further comprises a button, an end of the button is connected with the control module, the other end of the button is grounded, the button is configured to control the control module output different adjusting signals to the music chip, the music chip is configured to adjust a volume of the horn according to the adjusting signals.

7. The intelligent music lamp string of claim 1, wherein the lamp string comprises a protection resistance, an NPN type transistor and an LED string, an end of the protection resistance is connected with the control module, the other end of the protection resistance is connected with a base of the NPN type transistor, a collector of the NPN type transistor is connected with a negative electrode of the LED string, an emitter of the NPN type transistor is grounded, a positive electrode of the LED string is configured to receive a power signal.

8. The intelligent music lamp string of claim 1, wherein the predetermined way corresponding to the predetermined music comprises a working mode that a duty cycle of the control signal in each cycle corresponds to beats of each section of the predetermined music.

9. The intelligent music lamp string of claim 8, wherein the control signal is generated according to beats of the predetermined music, the beats of each section of the predetermined music comprises a strong beat and a weak beat, when the strong beat is provided, a voltage level of the control signal is a first voltage level, and when the weak beat is provided, the voltage level of the control signal is a second voltage level different from the first voltage level.

10. The intelligent music lamp string of claim 9, wherein the first voltage level is high level, and the second voltage level is low level.

11. The intelligent music lamp string of claim 1, wherein the human body sensing module is configured to sense movement of the human body by a radar in real time so as to sense the human body.

12. An intelligent music lighting device, comprising:

a human body sensor capable of generating a sensing signal;

a controller, electrically connected to the human body sensor;

a lamp string electrically connected to the controller; and wherein the controller comprises a music chip and a horn, an enable end of the music chip is electrically connected to the human body sensor, an output end of the music chip is electrically connected to the horn, the predetermined music is stored in the music chip, and when the controller receives the sensing signal, the controller controls the music chip to enable the horn to play the predetermined music, and the lamp string working in a predetermined way corresponding to the predetermined music.

13. The intelligent music lighting device of claim 12, wherein the controller further comprises a control module, the control module is configured to receive the sensing signal and output an enable signal and a control signal according to the sensing signal, the enable signal and the control signal being outputted by different output terminals.

14. The intelligent music lighting device of claim 13, wherein a chip model of the control module is FMD FT61XX, a chip model of the human body sensing module is RCWL-0517, and a chip model of the music chip is EV3P087J.

15. The intelligent music lighting device of claim 13, wherein the lamp string is configured to receive the control signal, and when the lamp string receives the control signal, the lamp string working in a predetermined way corresponding to the predetermined music.

16. The intelligent music lighting device of claim 12, wherein the predetermined way corresponding to the predetermined music comprises a working mode that a duty cycle of the control signal in each cycle corresponds to beats of each section of the predetermined music.

17. The intelligent music lighting device of claim 16, wherein the control signal is generated according to beats of the predetermined music, the beats of each section of the predetermined music comprises a strong beat and a weak beat, when the strong beat is provided, a voltage level of the control signal is a first voltage level, and when the weak beat is provided, the voltage level of the control signal is a second voltage level different from the first voltage level.

18. The intelligent music lighting device of claim 17, wherein the first voltage level is high level, and the second voltage level is low level.

19. A method for providing an intelligent music lamp string, the method comprising:

providing a human body sensor capable of generating a sensing signal;

providing a control module, electrically connected to the human body sensing module and configured to receive the sensing signal and output an enable signal and a control signal according to the sensing signal;

providing a music chip and a horn, an enable end of the music chip is electrically connected to the control module and configured to receive the enable signal and to control the horn to play predetermined music according to the enable signal, an output end of the music chip is electrically connected to the horn, the predetermined music is stored in the music chip;

providing a lamp string, electrically connected with the control module and configured to receive the control signal; and wherein when the control module receives the sensing signal from the human body sensor, outputting the enable signal and the control signal according to the sensing signal, when the music chip receives the enable signal from the control module, controlling the horn to play the predetermined music according to the enable signal, and when the lamp string receives the control signal, working in a predetermined way corresponding to the predetermined music.

20. The method for providing an intelligent music lamp string of claim 19, wherein the predetermined way corresponding to the predetermined music comprises a working mode that a duty cycle of the control signal in each cycle corresponds to beats of each section of the predetermined music.

* * * * *